US009794421B2

(12) United States Patent
Oltmanns et al.

(10) Patent No.: US 9,794,421 B2
(45) Date of Patent: Oct. 17, 2017

(54) METHOD, SYSTEM AND APPARATUS FOR ADAPTIVE QUOTA DETERMINATION FOR SHARED RESOURCES

(71) Applicant: REDKNEE INC., Mississauga (CA)

(72) Inventors: Claudia Oltmanns, Berlin (DE); Uwe Gleinig, Berlin (DE)

(73) Assignee: REDKNEE INC., Mississauga (CA)

( * ) Notice: Subject to any disclaimer, the term of this patent is extended or adjusted under 35 U.S.C. 154(b) by 0 days.

(21) Appl. No.: 15/108,829

(22) PCT Filed: Apr. 24, 2015

(86) PCT No.: PCT/CA2015/000269
§ 371 (c)(1),
(2) Date: Jun. 29, 2016

(87) PCT Pub. No.: WO2015/161361
PCT Pub. Date: Oct. 29, 2015

(65) Prior Publication Data
US 2016/0373590 A1 Dec. 22, 2016

Related U.S. Application Data

(60) Provisional application No. 61/984,356, filed on Apr. 25, 2014.

(51) Int. Cl.
*H04M 11/00* (2006.01)
*H04M 15/00* (2006.01)
(Continued)

(52) U.S. Cl.
CPC ...... *H04M 15/785* (2013.01); *H04L 12/1407* (2013.01); *H04L 12/1435* (2013.01);
(Continued)

(58) Field of Classification Search
None
See application file for complete search history.

(56) References Cited

U.S. PATENT DOCUMENTS

| 5,446,737 A | 8/1995 | Cidon et al. |
| 2014/0108212 A1 | 4/2014 | Cassel |
| 2014/0378094 A1* | 12/2014 | Gillick ............. H04M 15/7652 455/406 |

FOREIGN PATENT DOCUMENTS

WO 2009128874 A1 10/2009

OTHER PUBLICATIONS

International Search Report dated Jul. 21, 2015 issued from the Canadian Intellectual Property Office relating to PCT International Application No. PCT/CA2015/000269.
(Continued)

*Primary Examiner* — Suhail Khan
(74) *Attorney, Agent, or Firm* — Kristjan Spence; Perry + Currier Inc.

(57) ABSTRACT

A method of adapting quotas for a shared resource in a network includes: retrieving, at a charging server, a usage level and a time period for each of a plurality of communication sessions associated with the shared resource, the communication sessions corresponding to respective client devices connected to the network; determining, at the charging server, whether the shared resource can support each of the communication sessions for the corresponding retrieved usage level and time period; when the determination is negative, determining a common reduced time period for each of the communication sessions at the charging server; and at the charging server, when the reduced time period exceeds a predefined threshold, allocating quotas to each of the communication sessions from the shared resource based on the usage levels and the reduced time period.

22 Claims, 7 Drawing Sheets

(51) Int. Cl.
H04L 12/14 (2006.01)
H04W 4/24 (2009.01)
(52) U.S. Cl.
CPC .... *H04L 12/1467* (2013.01); *H04M 15/7652* (2013.01); *H04W 4/24* (2013.01)

(56) References Cited

OTHER PUBLICATIONS

Written Opinion dated Jul. 21, 2015 issued from the Canadian Intellectual Property Office relating to PCT International Application No. PCT/CA2015/000269.
International Preliminary Report on Patentability dated Jun. 14, 2016 issued from the Canadian Intellectual Property Office relating to PCT International Application No. PCT/CA2015/000269.

* cited by examiner

METHOD, SYSTEM AND APPARATUS FOR ADAPTIVE QUOTA DETERMINATION FOR SHARED RESOURCES

CROSS-REFERENCE TO RELATED APPLICATION

This application claims priority from U.S. provisional application No. 61/984,356, filed Apr. 25, 2014, the contents of which is hereby incorporated by reference.

FIELD

The specification relates in general to telecommunications, and specifically to a method, system and apparatus for adaptive quota determination for shared resources in a communications system.

BACKGROUND

Some mobile devices, such as cell phones and smart phones, are associated with shared subscriptions in which a single pool of data is available to be shared among several such devices.

Progress in mobile network technology allows greater volumes of data to be consumed by any one mobile device, and the gaps between the usage behaviour of different devices have been able to increase as a result. For example, one of a set of devices sharing a single data pool may consume data at a rate many times higher than another of the set of devices. Both devices are allocated certain quotas during use, but the "high volume" device may find itself interrupted repeatedly as it exhausts its quota but cannot secure another quota because the remainder of the pool is still reserved by the "low volume" device.

Current attempts to balance the quotas for the set of devices can lead to interruptions as mentioned above, to undesirably high signalling traffic, or both.

BRIEF DESCRIPTIONS OF THE DRAWINGS

Embodiments are described with reference to the following figures, in which.

DETAILED DESCRIPTION OF THE EMBODIMENTS

Figure 1:
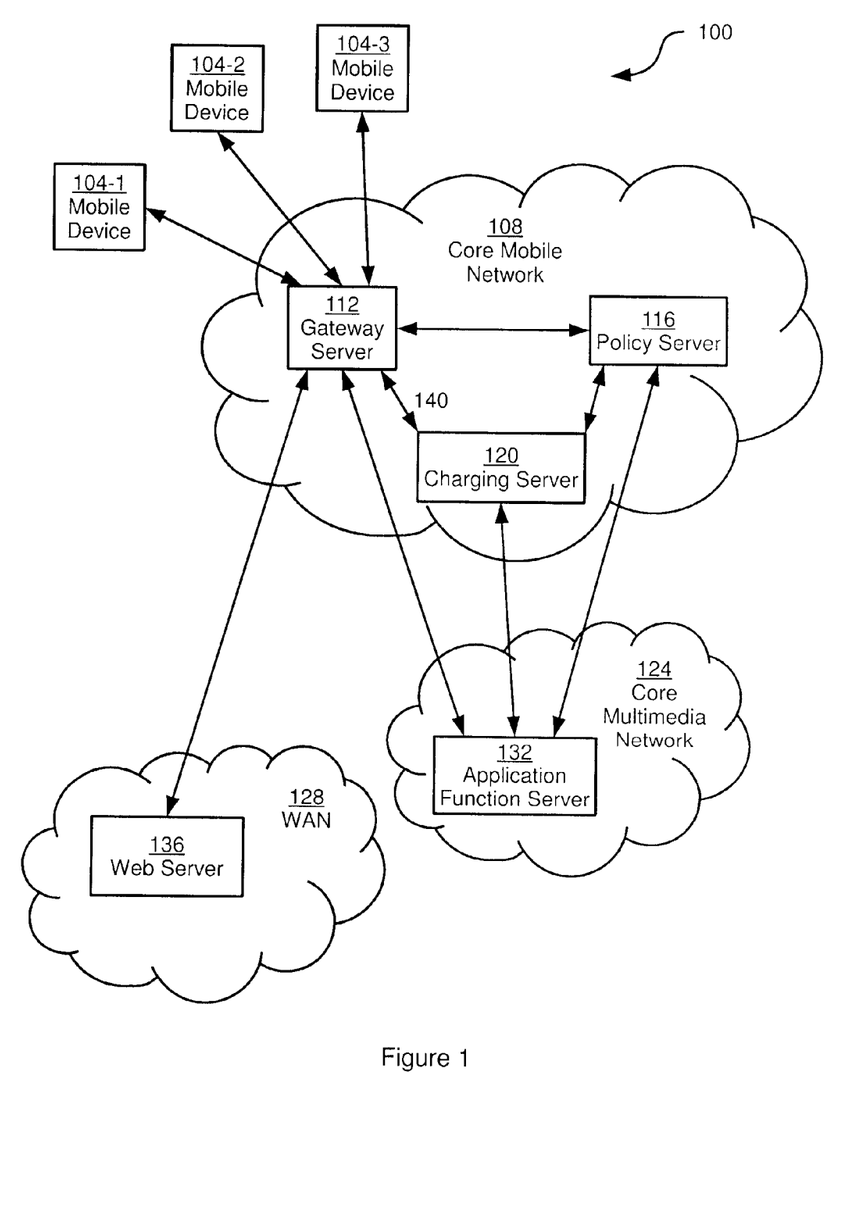
FIG. 1 depicts a communication system, according to a non-limiting embodiment.

FIG. 1 depicts a communications system 100. System 100 includes a plurality of mobile devices 104-1, 104-2, 104-3 (collectively referred to as mobile devices 104, and generically referred to as a mobile device 104), each of which can be any of a variety of mobile computing devices, and thus has hardware elements including a processing unit, volatile and non-volatile memory, network interfaces, input and output devices (e.g. displays, speakers, microphones, touch screens and the like). The processing units of mobile devices 104 execute programming instructions stored in memory for carrying out various functions, including the initiation of data communications over certain networks.

In the embodiments discussed herein, mobile devices 104 are cell phones or smart phones, able to connect to one or both of packet switched (e.g. Long Term Evolution (LTE)) and circuit switched (e.g. Global System for Mobile communications (GSM)) networks. Thus, mobile devices 104 include the necessary network interface hardware, and stored programming instructions, to communicate with a core mobile network 108. In the present example, core mobile network 108 is structured according to the Long Term Evolution (LTE) standard set by the 3rd Generation Partnership Project (3GPP). The features described herein may also be applied to other networks, as will be apparent to those skilled in the art.

Core mobile network 108 includes a gateway server 112, a policy server 116, and a charging server 120. In the present example, in which core network 108 is the LTE core network, gateway server 112 may also be referred to as a Packet Data Network Gateway (PDN Gateway or P-GW); policy server 116 may also be referred to as a Policy and Charging Rules Function (PCRF); and charging server 120 may also be referred to as an Online Charging System (OCS). Certain features of a P-GW, PCRF and OCS in an LTE network will be known to those skilled in the art from published 3GPP specifications. However, charging server 120 includes additional features, described herein, that extend beyond those set out in the 3GPP specifications.

Other elements of core mobile network 108 (such as a Mobility Management Entity, MME, and a Home Subscriber Server, HSS) can be implemented conventionally, and are therefore not shown herein for simplicity.

Gateway server 112 allows mobile devices 104 to access other data networks, including a core multimedia network 124 and a wide area network (WAN) 128. In the present example, core multimedia network 124 is an IP Multimedia Subsystem (IMS) network, and WAN 128 is the Internet. Mobile devices 104 establish communications with gateway server 112, and then (via gateway server 112) may communicate with other network elements that provide a variety of services to mobile devices 104.

Policy server 116 generates rules for communication sessions between mobile device 104 and gateway 112. Such rules can govern Quality of Service (QoS) parameters, charging parameters, and the like. Policy server 116 provides those rules to gateway server 112, and gateway server 112 applies the rules to its communication sessions with mobile devices 104.

Examples of network elements with which mobile devices 104 can communicate via gateway server 112 include an Application Function (AF) server 132 in core multimedia network 124 and a web server 136 in WAN 128. AF server 132 can be, for example, a call session and control server, such as a known Proxy Call Session Control Server (P-CSCF) that participates in setting up incoming and outgoing media sessions (e.g. voice over IP calls, video streaming, and the like) between mobile devices 104 and other devices (e.g. other mobile devices, media servers in WAN 128, and the like). Web server 136 can host one or more web pages accessible to mobile devices 104.

Charging server 120 is responsible for maintaining an account associated with mobile devices 104 (that is, a shared account associated with all three of mobile devices 104-1, 104-2 and 104-3). When a mobile device 104 is engaged in a communications session via gateway server 112, charging server 120 deducts from the account based on the usage (e.g. volume of data) associated with the session. Conventionally (as defined in the 3GPP specification 32.296), at the beginning of the session, and intermittently throughout the session, charging server 120 provides a quota (e.g. in financial units, time, units of data, etc.) to gateway server 112 over a link 140. As the communication session proceeds, gateway server 112 detects data usage within the session and deducts the detected usage from that quota. Gateway server 112 also informs charging server 120 of the usage and deductions over link 140. Link 140 may be based, for example, on the Ro interface (defined in the 3GPP specifications 32.299, 32.251, 32.260, etc.) or the Gy instance of Ro.

When the quota is exhausted, charging server 120 determines and provides a new quota to gateway server 112 over link 140 to allow the session to continue. Quotas are reserved against a balance of the account associated with the mobile device 104. When a quota is consumed, the quota is deducted from the account balance, and an additional portion of the account balance is marked as reserved for the subsequent quota.

Figure 2:
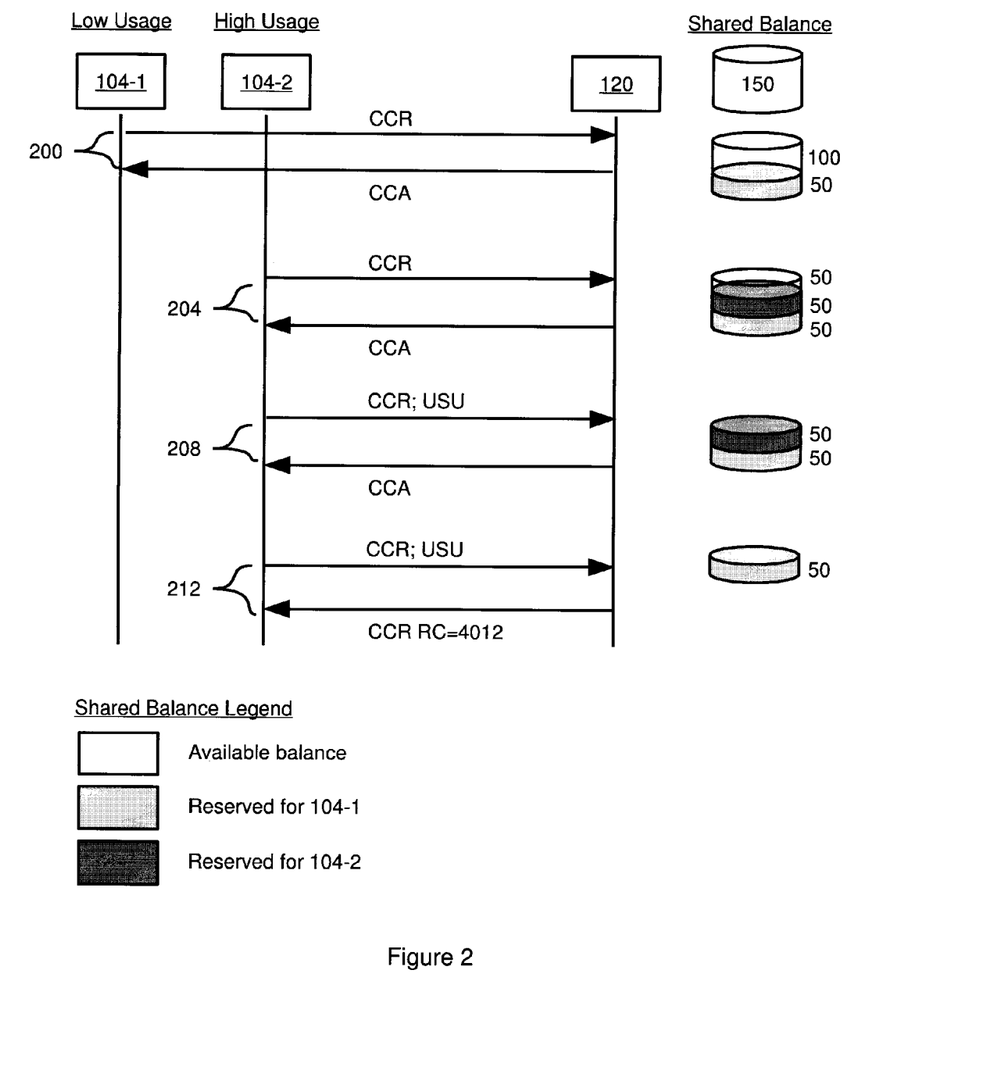
FIG. 2 depicts a quota allocation scenario in the system of FIG. 1, according to a non-limiting embodiment.

As mentioned above, the account maintained by charging server 120 is shared between the three mobile devices 104 shown in FIG. 1. In other words, as each of mobile devices 104-1, 104-2 and 104-3 consumes data, the quotas provided from charging server 120 to gateway server 112 are all reserved from the same account balance. As shown in FIG. 2, this situation can lead to interruptions in service.

FIG. 2 illustrates an example scenario, employing conventional quota allocations, in which mobile device 104-1 and mobile device 104-2 both begin communication sessions via gateway server 112. In this example, mobile device 104-1 is referred to as a "low usage" device because it engages in a web browsing session, which requires relatively low bandwidth consumption. Mobile device 104-2, on the other hand, is referred to as a "high usage" device because it engages in video streaming, which generally consumes more bandwidth than web browsing. At step 200, mobile device 104-1 initiates a session by sending a request (a Credit Control Request, CCR) containing a requested quota (Requested Service Unit, RSU) to charging server 120. It will be understood that in some embodiments, the messages from mobile devices 104-1 and 104-2 shown in FIG. 2 will in fact be sent by gateway 112 or other network components, on behalf of mobile devices 104-1 and 104-2. In response, charging server 120 reserves a quota of fifty units (which may be the requested amount, but need not be) for that session from the balance of one hundred and fifty in the account shared by devices 104-1 and 104-2. The balance, and reserved portions thereof, are illustrated along the right-hand side of FIG. 2. Charging server 120 informs mobile device 104-1 of the quota reservation in a Credit Control Answer (CCA) message containing an indication that fifty units are granted (Granted Service Unit, GSU). The response from charging server 120 indicating the quota also specifies a validity time (VT) of ten minutes for the quota, meaning unused portions of the quota will not be released to be made available for other sessions for ten minutes.

At step 204, device 104-2 initiates a session by sending a request to charging server 120, and a similar reservation process is followed, in which charging server 120 reserves another fifty units for the second session and informs device 104-2 of the reservation. As a result, two fifty-unit quotas, one for each session, have been reserved from the account balance of one hundred and fifty.

At step 208, mobile device 104-2 has consumed the initial quota of fifty units, and transmits a message to charging server 120 indicating that fifty units have been used (Used Service Unit, USU) and requesting a further reservation. In response, at charging server 120 another quota of fifty units is reserved, and the account balance is decreased to one hundred units (due to the consumption of the initial quota for device 104-2), and a quota of fifty units is in place for each session. Of note, the entire balance of one hundred units is now reserved by the existing quotas.

At step 212, mobile device 104-2 consumes the second quota of fifty units established at step 208, and an attempt is made (for example, by gateway server 112) to reserve another quota of fifty units. However, following the consumption of the second quota by mobile device 104-2, the remaining balance in the account is only fifty units, and the entirety of that remaining balance is reserved for mobile device 104-1's session, despite the fact the mobile device 104-1 has not yet consumed any of its quota. Thus, in response to the further request at step 212, charging server 120 returns a CCR containing the result code (RC) "4012" or an equivalent error code indicating that there is no available balance to satisfy the request. Further, the reservation for mobile device 104-1 may not expire for several more minutes (the "high usage" mobile device 104-2 may in fact exhaust the quotas shown in FIG. 2 in only a few seconds). Therefore, the session of mobile device 104-2 is interrupted for several more minutes until the unused quota reserved for mobile device 104-1 is released.

To reduce the incidence of situations such as those in FIG. 2, charging server 120 performs certain functions that go beyond the activities of conventional charging servers. Before discussing those functions, a description of the components of charging server 120 will be provided.

Figure 3:
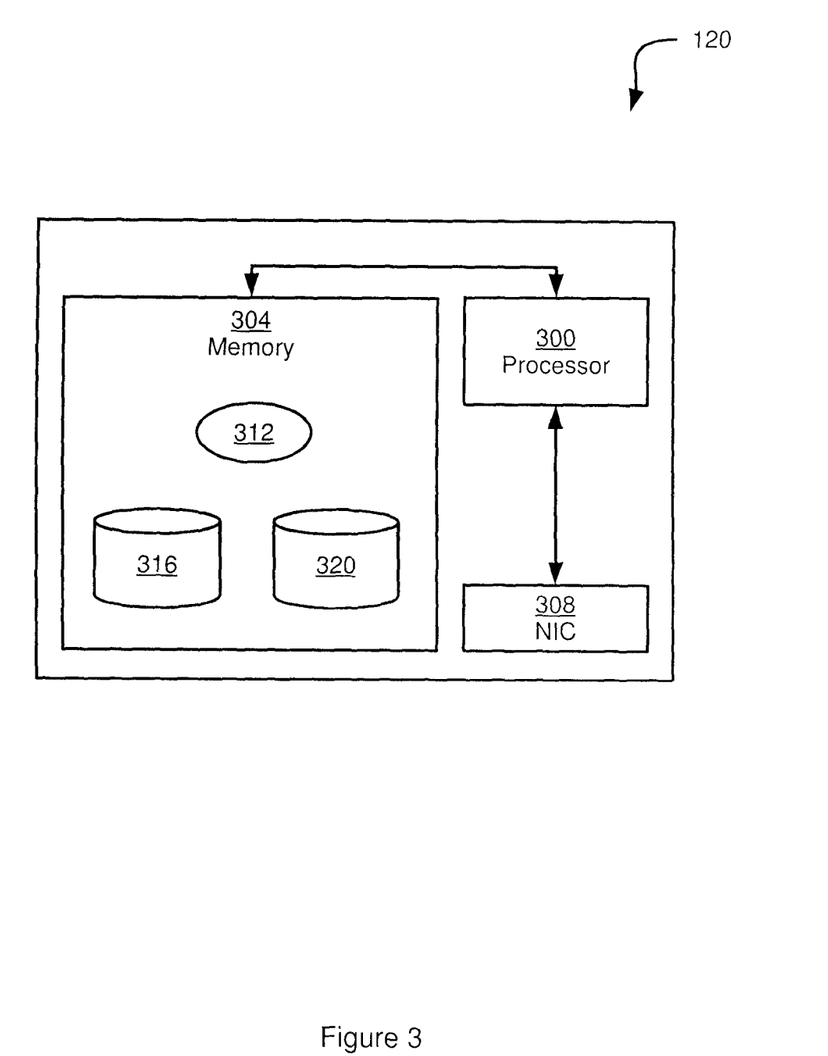
FIG. 3 depicts certain internal components of the charging server of FIG. 1, according to a non-limiting embodiment.

Turning to FIG. 3, certain internal components of charging server 120 are depicted. Charging server 120 includes a central processing unit (CPU) 300, also referred to herein as a processor 300, interconnected with a memory 304. Processor 300 and memory 304 are generally comprised of one or more integrated circuits (ICs), and can have a variety of structures, as will now occur to those skilled in the art (for example, more than one CPU can be provided).

Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 304 includes both volatile and non-volatile storage.

Processor 300 is also interconnected with one or more network interfaces, such as a network interface controller (NIC) 308, which allows charging server 120 to connect to other computing devices in networks 108, 124 and 128. NIC 308 thus includes the necessary hardware to communicate over the above networks. Charging server 120 can also include input devices (not shown) interconnected with processor 300, such as a keyboard and mouse, as well as output devices (not shown) interconnected with processor 300, such as a display. In some embodiments, the input and output devices can be connected to processor 300 via NIC 308 and another computing device. In other words, input and output devices can be local to charging server 120, or remote.

Memory 304 stores a plurality of computer-readable programming instructions, executable by processor 300, in the form of various applications, and also stores various types of data for use during the execution of those applications. As will be understood by those skilled in the art, processor 300 may execute the instructions of one or more such applications in order to perform various operations defined within the instructions. In the description below, processor 300 or charging server 120 more generally are said to be "configured to" or "operated to" perform certain functions. It will be understood that charging server 120 is so configured via the processing of the instructions of the applications stored in memory 304.

Among the applications stored in memory 304 is a quota allocation application 312, also referred to herein as a quota application 312. In addition, memory 304 contains an account database 316 and a tariff database 320. Account database 316 contains account balances for a plurality of accounts, including the shared account associated with mobile devices 104-1, 104-2 and 104-3. Tariff database 320 contains data used for rating communication sessions (e.g. rates for various services).

Figure 4:
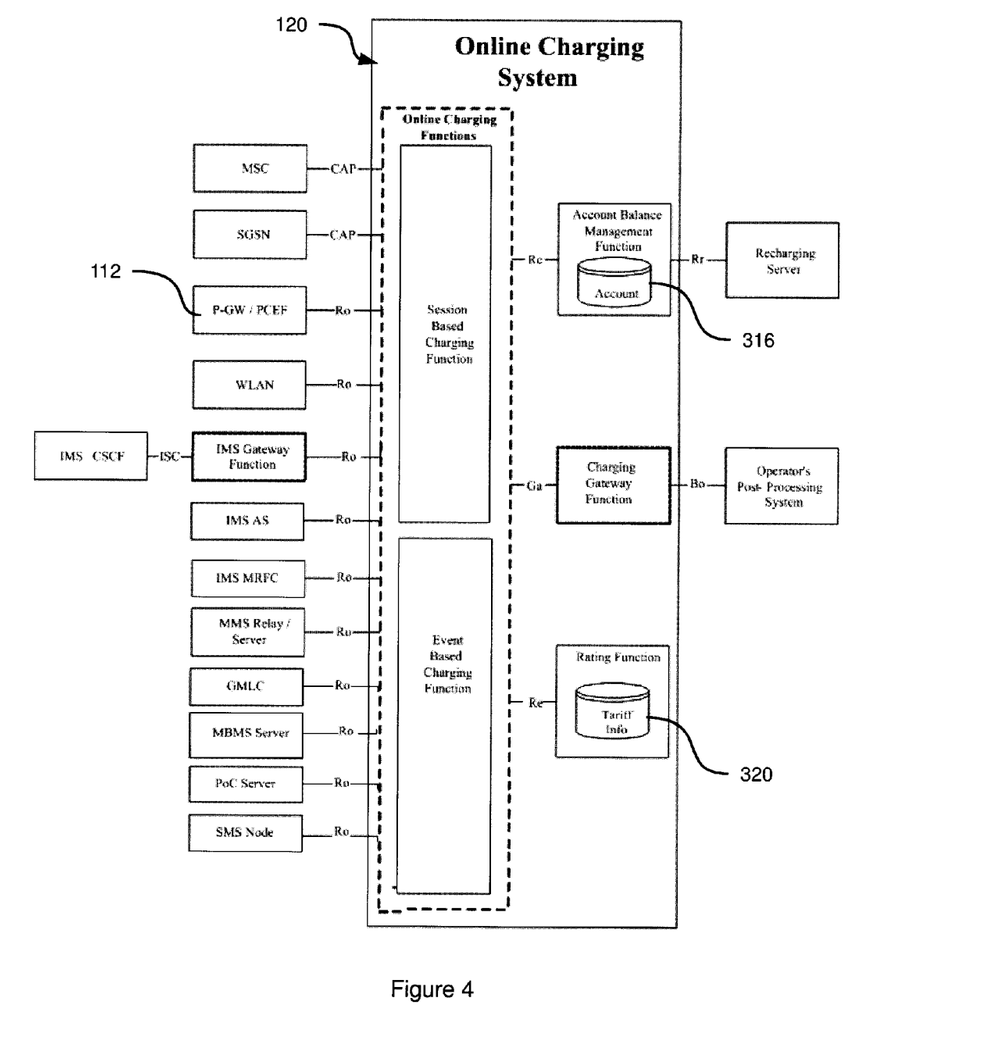
FIG. 4 depicts certain functional components of the charging server of FIG. 1, according to a non-limiting embodiment.

Another schematic illustration of charging server 120 is shown in FIG. 4. Quota application 312, either alone or in conjunction with other applications executable on charging server 120, can implement charging functions (for example, the session based and event based charging functions shown in FIG. 4). Charging server 120 interfaces with a variety of other network elements, including gateway server 112, and updates account balances in database 316 as necessary.

Figure 5:
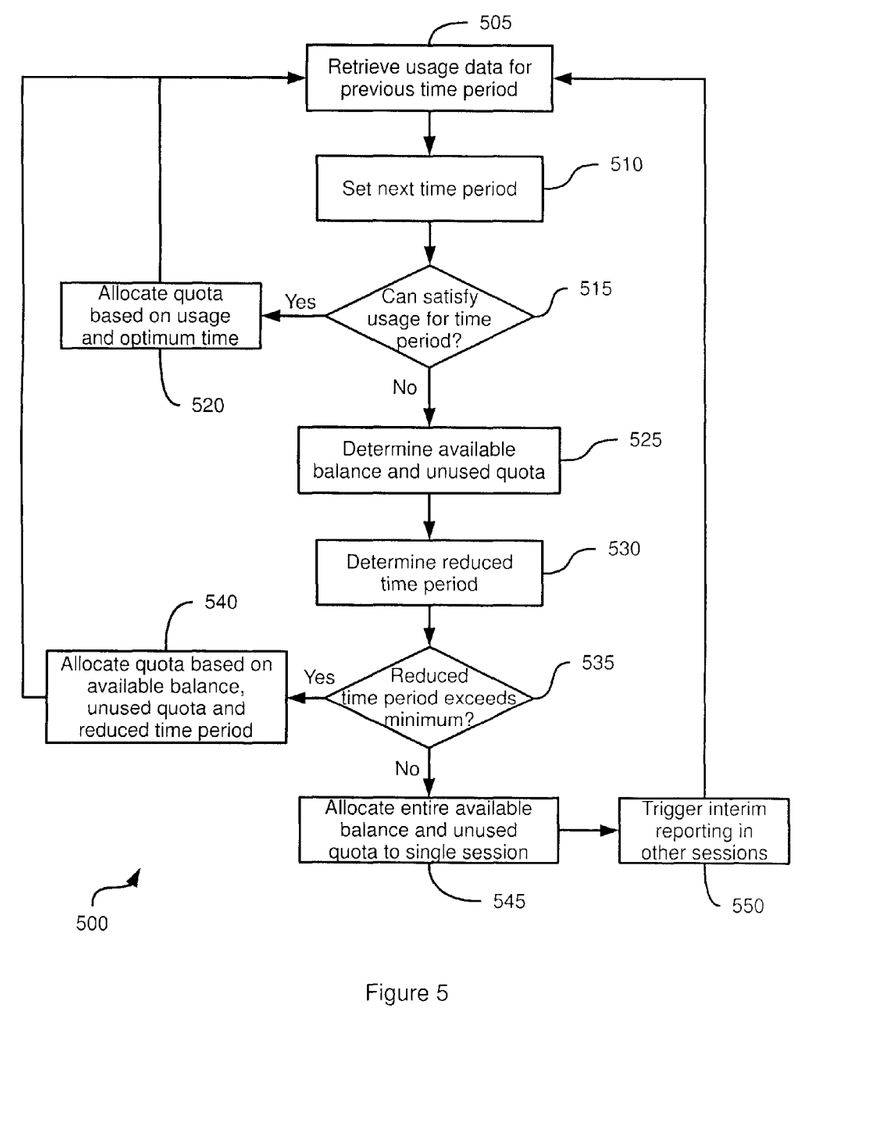
FIG. 5 depicts a method of adapting quotas in the system of FIG. 1, according to a non-limiting embodiment.

Through the execution of quota application 312, charging server 120 is configured to determine and provide quotas and validity times to gateway server 112 for media sessions involving mobile devices 104. The quotas and their validity times can be tuned throughout the sessions to adapt to current usage patterns and avoid the interruption of any one session. Turning now to FIG. 5, an example of the operations performed by charging server 120 will be discussed.

FIG. 5 illustrates a method 500 for adaptive quota determination in system 100, and particularly at charging server 120. It is assumed that, prior to beginning the performance of method 500, each of mobile devices 104-1, 104-2 and 104-3 (or indeed any other number of mobile devices 104) have established communication sessions via gateway 112, and are thus in a position to consume resources shared amongst the three devices 104.

In order to permit the consumption of resources by mobile devices 104 to begin, charging server 120 allocates a quota for each device 104. The nature of the quota is not particularly limited, but in the present discussion it will be assumed that the quotas are volumes of data (e.g. one hundred megabytes). In other embodiments, the quotas can be monetary values, for example. The determination of what quota to allocate for each service begins at block 505. It is contemplated that the blocks of method 500 are performed multiple times in parallel, once for each of the three sessions.

At block 505, charging server 120 retrieves usage data for a previous time period (for example, the time elapsed since the previous usage report for a given session was received at charging server 120 from gateway server 112). Such usage data is stored in memory 304 upon receipt from gateway server 112. More specifically, charging server 120 stores, for each session, the following values: a session identifier; a timestamp of the most recent reporting event for the session; a usage (e.g. a volume of data consumed since the previous reporting event); and the most recent valid time for the most recent quota allocated to that session. Charging server 120 may also store a running average of usage for a plurality of previous time periods. At block 505, charging server may therefore determine a bandwidth (in data volume per unit time) for the previous time period.

For the first performance of block 505 for a given session, there may not be any previous usage data. Therefore, charging server 120 can assume, for the first performance of block 505, that the session will consume the maximum available bandwidth. In other embodiments, charging server 120 can assume instead that the session will consume 50% of the maximum available bandwidth, or any other proportion of the maximum available bandwidth.

At block 510, charging server 120 sets a time period to be used for the next quota allocation. The time period set at block 510 is not particularly limited: for an initial performance of block 510 (i.e. for a new session, for which no usage data is available yet), a relatively short time period (e.g. 5-10s) may be selected to minimize the allocated quota while still providing a sufficient window in which actual usage can be gauged. For established sessions with known usage (e.g. sessions for which previous usage data is available in memory 304 covering one or more previous time periods), the time period selected at block 510 can be longer (e.g. 15 min). The time period selected for each session can also vary based on the nature of the session. For example, low-volume sessions (such as web-browsing sessions) may have longer time periods set at block 510. Session types (e.g. web browsing in contrast to video streaming) can be determined by charging server 120 based on traffic data received at charging server 120 from gateway 112. Alternatively, the same time period may be set for all sessions at block 510.

At block 515, charging server 120 determines whether there are sufficient resources in the account shared by mobile devices 104 to satisfy the usage retrieved at block 505 over the time period set at block 510, for all three sessions. The resources accounted for at block 515 can include any unreserved balance in the shared account, as well as any reserved quotas that are likely not to have been used as of yet (the determination of unused quotas will be discussed below). Alternatively, only the unreserved account balance may be considered at block 515. In other embodiments, the performance of block 515 may consider only one session, by determining whether a fraction of the available resources (for instance, 1/X, where X is the number of sessions) is sufficient to satisfy that session's previous usage for the time period. In some embodiments, the available resources assessed at block 515 can be reduced by an estimated volume of resources necessary to support a new, as-yet non-existent, session for a predefined time period (generally a short time period such as 10s). The predefined time period is selected to be sufficient to let the new session survive until another session has released a portion of the shared resource. Such a new session may be artificially delayed if the underlying protocol allows, e.g. by temporarily reducing the bandwidth for the new session, to allow time for other sessions to arrive at their reporting times and release unused resources.

If the determination at block 515 is affirmative—that is, if there are sufficient available resources to allow each service to continue its previous usage for the selected time period (e.g. 15 min), performance of method 500 proceeds to block 520, at which a quota is allocated for the service currently subject to the performance of method 500 based on the usage data and the time period. Allocating a quota includes setting a quota parameter (e.g. the volume of data for the quota), and a validity time (VT) parameter defining how long that volume of data will be reserved for the session. Quota allocation can also optionally include setting a volume quota threshold (VQT) parameter defining a threshold for gateway server 116 to start early usage reporting for the session, and a quota holding time (QHT) parameter defining a timeout period beyond which, if the session is inactive, the quota will be released. QHT is generally smaller than VT. VQT may be set to a value which is the equivalent of the predicted volume of data used in 1-5 seconds, to enable the supervising network element (e.g. gateway server 112) to cover the gap between quota reporting and new quota assignment without or with limited over charge in the next reporting interval. Due to the parallel performance of method 500 for each session, quotas may be allocated to each of the shared sessions in the above manner by the repeated performance of block 520.

If the determination at block 515 is negative—that is, if there are not sufficient resources available to allow each service to continue its previous usage for the selected time period—performance of method 500 proceeds to block 525. At block 525, charging server 120 determines the total available resources, including both available (that is, unreserved by existing quotas) balance and portions of existing quotas that have likely not yet been used. The determination at block 525 may be performed as follows:

Unreserved balance calculation:

Remaining_available_quota=Balance_Value−Authorized_Quota.

Calculation of portions of existing quotas that are likely not yet consumed: Remaining_authorized_quota=sum for each session[(VT−Current_TimeStamp)×(quota/VT);
that is, for each session, multiply the remainder of the valid time starting from the current time stamp by the expected bandwidth consumption, given by dividing the quota by the valid time.

Calculation of the available balance and unused quota:
        Unused_quota=Remaining_available_quota+ Remaining_authorized_quota.

Having determined all available resources to be allocated to the sessions, charging server 120 determines, at block 530, a reduced time period during which the available resources will be consumed, such that each session will exhaust its allocated resources at approximately the same time (in some embodiments, the VT parameters for each session can be staggered to avoid signalling peaks when all the quotas expire at the same time). The determination of the reduced time period may be performed as follows:

Calculation of the accumulated usage of all parallel sessions for 1 second:
        Accumulated_Usage=Sum for all sessions[Usage] (that is, the total bandwidth consumed by all sessions based on data retrieved at block 505).

Calculation of the reduced time period common for all parallel sessions: Reduced_consumption_ time=(Unused_quota−Initial_Quota_ for_new_session)/ Accumulated_Usage (where the initial quota for a new session is the reserved resource for a potential new session mentioned above).

At block 530, charging server 120 determines whether the reduced time period exceeds a predefined minimum. The predefined minimum may be any value. For example, in the present embodiment, the predefined minimum is ten seconds. If the determination at block 535 is affirmative, then charging server 120 allocates a quota to the current session (and allocates quotas to the other shared sessions in parallel performances of method 500) at block 540 based on the determinations at blocks 525 and 530.

Each individual session's quota for the next interval may also be computed as follows:
        Quota=Reduced_consumption_time*Usage.

If the determination at block 535 is negative, however, performance of method 500 proceeds to block 545. At block 545, charging server 120 allocates the entire unused resource determined at block 525 to a single one of the sessions. Which session receives the remaining unused resources is not particularly limited. For example, the session with the highest usage may be selected. Following allocation of all remaining unused resources as a quota for one particular session, at block 550 charging server 120 can trigger an interim usage report for one or more of the other sessions. The interim reporting can also be triggered earlier in method 500.

Interim reporting causes the targeted sessions to report their current usages and to release any unused portions of their existing quotas. Sessions can be selected for interim reporting based on a variety of factors, including the length of time until the next expected usage report, whether the next expected usage report falls after the reduced time period from block 530, the amount of unused quota, and the like. Interim reporting may release sufficient quota to allocate quota to other sessions and prevent interruptions of those other sessions. Examples of criteria applied to sessions by charging server 120 in determining which sessions to "wake up" for interim reporting are: not the sessions with VT values below a minimum VT; the sessions with the latest (i.e. furthest in the future) expiration of their current quota; the sessions with the largest volume of previously granted quota.

After the performance of any of blocks 520, 540, and 550, the performance of method 500 can return to block 505 upon expiry of the next time period, for re-allocation of quotas. Over multiple performances of method 500, the quotas allocated to each of the sessions may therefore change dynamically in response to the activities of the other sessions and the remaining available resources in the shared account. As a result, the incidence of blocks on any given session as discussed in connection with FIG. 2 may be reduced.

Figure 6:
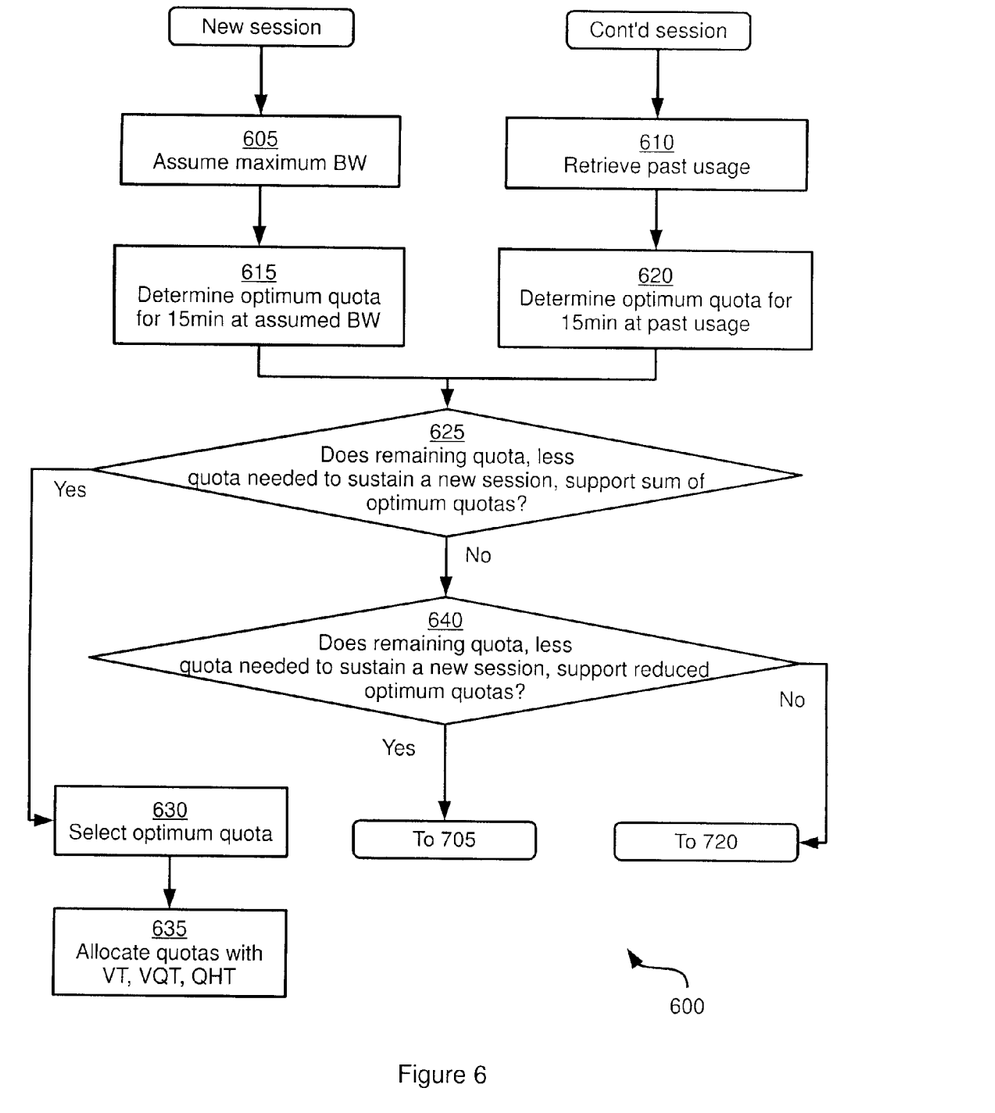
FIGS. 6 and 7 depict a method of adapting quotas in the system of FIG. 1, according to a further non-limiting embodiment.
Figure 7:
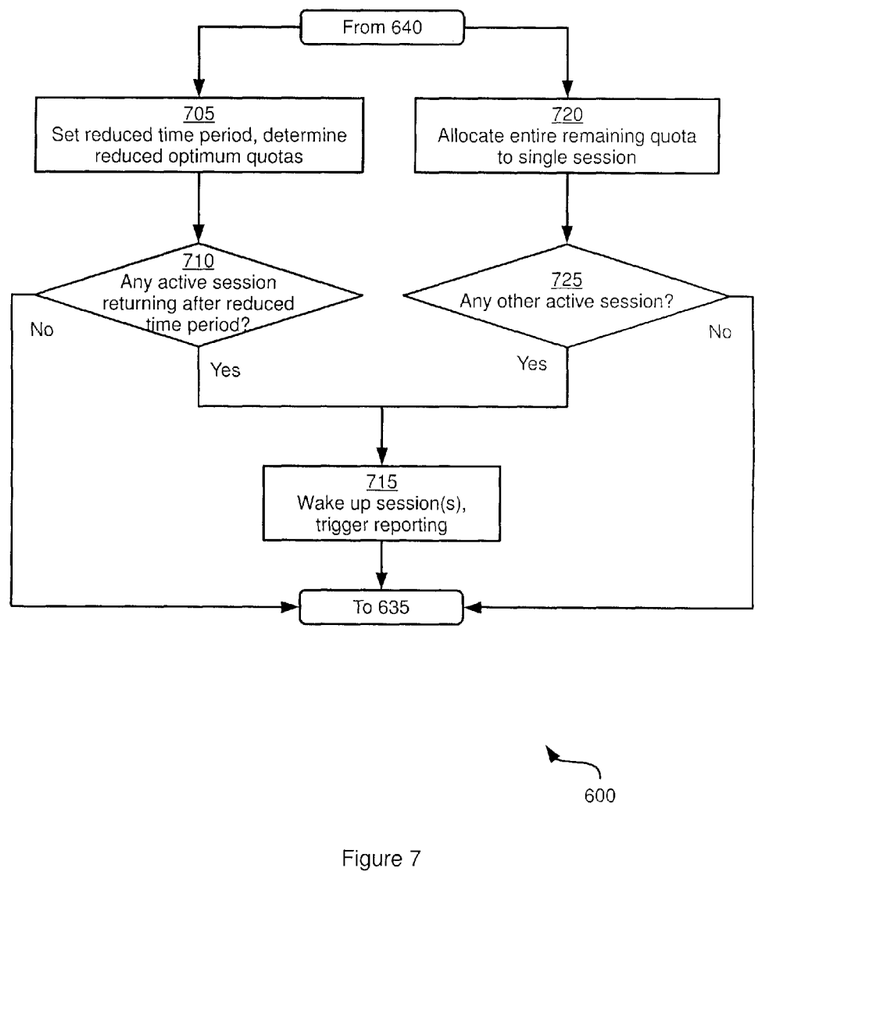

FIGS. 6 and 7 depict another example performance of a method 600, for adaptive quota determination. As will be seen below, method 600 can be considered a particular implementation of method 500. As with method 500, the performance of method 600 is repeated in parallel for each concurrent session. Further, as with method 500,method 600 may be repeated multiple times for each session (to dynamically update quotas).

Beginning at blocks 605 or 610 (depending on whether the presently-considered session is a new session or a continuation of an existing session), charging server 120 generates an estimated bandwidth usage rate for the session, based on either previous usage (for an existing session) or by assuming maximum bandwidth consumption or some portion of maximum bandwidth consumption. At blocks 615 and 620, charging server 120 determines an "optimum quota" that would be consumed based on the bandwidth estimations from blocks 605 and 610, over a predetermined time period (e.g. fifteen minutes).

In some embodiments, rather than assuming a certain bandwidth for new sessions, charging server 120 can allocate a small quota to the new session in order to gather usage data. Following the receipt of some usage data (e.g. for five seconds of usage), charging server 120 can instead treat the new session as a continued session, and perform block 620 rather than 615. Thus, blocks 605-620 align with blocks 505 and 510 of method 500.

Having determined optimum quotas for all active sessions, at block 625 charging server 120 is configured to determine whether the remaining quota (whether unreserved balance only, or unreserved balance in addition to allocated but likely not consumed quotas) can support both the optimum quotas and a new (not yet existing) session for a certain period of time (e.g. ten seconds). Thus, block 625 of method 600 aligns with block 515 of method 500.

When the determination at block 625 is affirmative, the performance of method 600 proceeds to blocks 630 and then 635, at which the optimum quotas mentioned above are allocated to active sessions, and other session parameters are set accordingly, as described above in connection with block 520 of method 500.

When the determination at block 625 is negative, however, performance of method 600 proceeds to block 640. At block 640, charging server 120 is configured to determine whether the remaining quota can support a new session for the above-mentioned period of time (e.g. ten seconds) and can also support the active sessions for a reduced optimum time period. The reduced time period can be determined as described above in connection with block 530.

When the determination at block 640 is affirmative, the performance of method 600 continues to block 705 (illustrated in FIG. 7). At block 705, charging server 120 is configured to set the reduced time period and determine corresponding reduced optimum quotas (based on the usage from blocks 605 and 610). Then, at block 710, charging server 120 is configured to determine whether any active session has a reporting period that would normally end after the reduced time period mentioned above. If such a session exists, at block 715 charging server 120 is configured to send a message to the corresponding device 104 to trigger interim reporting (as in block 550 of method 500). The performance of method 600 then proceeds to block 635 (which, in this sequence, corresponds to block 540 of method 500).

When the determination at block 640 is negative (e.g. when the remaining quota only supports a single session for a short period of time), the performance of method 600 proceeds to block 720, shown in FIG. 7. At block 720 (which aligns with block 545 of method 500) charging server 120 is configured to allocate the entire remaining quota to a single session, and to then determine at block 725 whether any parallel sessions are active. If the determination at block 725 is negative, performance of method 600 returns to block 635. If the determination at block 725 is affirmative, however, charging server 120 performs block 715, as discussed above.

Following the performance of block 720, an offline repurchase process may also be initiated by charging server 120. For example, charging server 120 may initiate the transmission of an SMS or other message to the relevant device 104 suggesting that the device provide additional funds.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of adapting quotas for a shared account balance in a network, comprising:
    retrieving, at a charging server, a usage level and a time period for each of a plurality of communication sessions associated with the shared account balance, the communication sessions corresponding to respective client devices connected to the network;
    determining, at the charging server, whether the shared account balance exceeds a combined predicted usage of the communication sessions for the corresponding retrieved usage levels and time periods;
    when the determination is negative, determining a common reduced time period for each of the communication sessions at the charging server; and
    at the charging server, when the reduced time period exceeds a predefined threshold, allocating quotas to each of the communication sessions from the shared account balance based on the usage levels and the reduced time period.

2. The method of claim 1, further comprising:
    selecting the time period based on a type of service received at the charging server from a gateway server.

3. The method of claim 1, further comprising:
    at the charging server, determining whether the shared account balance can support each of the communication sessions by:
        determining an allocatable balance of the shared account balance; and
        comparing the allocatable balance to the sum of the products of the time period and the usage level for each communication session.

4. The method of claim 3, wherein the allocatable balance comprises an unreserved balance of the shared account balance stored in a memory of the charging server.

5. The method of claim 3, wherein the allocatable balance comprises a sum of the unreserved balance and an unconsumed amount of the shared account balance previously allocated to the communication sessions.

6. The method of claim 1, further comprising:
    retrieving a usage level for each communication session by:
        when the communication session is new, selecting a predefined portion of a maximum bandwidth available to the communication session; and
        when the communication session is not new, retrieving a previous usage level from a memory of the charging server.

7. The method of claim 2, further comprising:
    when the reduced time period does not exceed the predefined threshold, allocating the entire allocatable balance to a single selected one of the communication sessions.

8. The method of claim 1, further comprising:
    transmitting a message from the charging server to trigger usage reporting in at least one of the communication sessions.

9. The method of claim 1, wherein allocating quotas comprises transmitting a message from the charging server to a gateway server connected to the client devices.

10. The method of claim 9, wherein the message contains an indication of an allocated balance.

11. The method of claim 10, wherein the message further contains a valid time corresponding to the allocated balance.

12. A server for adapting quotas for a shared account balance in a network, comprising:
- a memory;
- a network interface; and
- a processor interconnected with the memory and the network interface, the processor configured to:
  - retrieve a usage level and a time period for each of a plurality of communication sessions associated with the shared account balance, the communication sessions corresponding to respective client devices connected to the network;
  - determine whether the shared account balance exceeds a combined predicted usage of the communication sessions for the corresponding retrieved usage levels and time periods;
  - when the determination is negative, determine a common reduced time period for each of the communication sessions; and
  - when the reduced time period exceeds a predefined threshold, allocate quotas to each of the communication sessions from the shared account balance based on the usage levels and the reduced time period.

13. The server of claim 12, the processor further configured to:
- select the time period based on a type of service received from a gateway server via the network interface.

14. The server of claim 12, the processor further configured to:
- determine whether the shared account balance can support each of the communication sessions by:
  - determining an allocatable balance of the shared account balance; and
  - comparing the allocatable balance to the sum of the products of the time period and the usage level for each communication session.

15. The server of claim 14, wherein the allocatable balance comprises an unreserved balance of the shared account balance stored in a memory of the charging server.

16. The server of claim 14, wherein the allocatable balance comprises a sum of the unreserved balance and an unconsumed amount of the shared account balance previously allocated to the communication sessions.

17. The server of claim 12, the processor further configured to:
- retrieve a usage level for each communication session by:
  - when the communication session is new, selecting a predefined portion of a maximum bandwidth available to the communication session; and
  - when the communication session is not new, retrieving a previous usage level from the memory.

18. The server of claim 12, the processor further configured to:
- when the reduced time period does not exceed the predefined threshold, allocate the entire allocatable balance to a single selected one of the communication sessions.

19. The server of any one of claim 12, the processor further configured to:
- transmit a message via the network interface to trigger usage reporting in at least one of the communication sessions.

20. The server of claim 12, wherein allocating quotas comprises transmitting a message from the charging server to a gateway server connected to the client devices.

21. The server of claim 20, wherein the message contains an indication of an allocated balance.

22. The server of claim 21, wherein the message further contains a valid time corresponding to the allocated balance.

* * * * *